United States Patent [19]

Martinez

[11] 4,179,440

[45] Dec. 18, 1979

[54] EPOXY EMULSION WATER-BASED COATING USING WATER-DISPERSIBLE EPOXY EMULSIFIER

[75] Inventor: Carlos J. Martinez, Edison, N.J.

[73] Assignee: Mobil Oil Corporation, New York, N.Y.

[21] Appl. No.: 973,276

[22] Filed: Dec. 26, 1978

Related U.S. Application Data

[63] Continuation-in-part of Ser. No. 909,858, May 26, 1958, abandoned.

[51] Int. Cl.$^2$ .............................................. C08L 61/28
[52] U.S. Cl. ....................... 260/29.4 R; 260/29.2 EP; 428/418; 428/460
[58] Field of Search ................... 260/29.2 EP, 29.4 R, 260/33.2 EP, 835, DIG. 9-DIG. 45; 252/351

[56] References Cited

U.S. PATENT DOCUMENTS

| | | | |
|---|---|---|---|
| 3,598,775 | 8/1971 | Huggard | 260/18 |
| 3,624,013 | 11/1971 | Sekmakas | 260/18 |
| 3,844,998 | 10/1974 | Jeffery | 260/29.4 R |
| 3,862,914 | 1/1975 | Anderson et al. | 260/29.2 EP |
| 4,026,857 | 5/1977 | Brown et al. | 260/29.4 R |

*Primary Examiner*—Theodore E. Pertilla
*Attorney, Agent, or Firm*—C. A. Huggett; J. F. Powers; H. S. Trigg

[57] ABSTRACT

A coating formulation comprises an oil-in-water emulsion of a solution of epoxy resin or capped epoxy resin in an alkoxy alcohol, such as 2-hexoxyethanol, as the dispersed phase, a curing agent, and a water-dispersible epoxy resin emulsifier. The emulsion is stable and has spreading and wetting properties over low energy and lubricated surfaces and aluminum, thus yielding films free from surface imperfections.

6 Claims, No Drawings

EPOXY EMULSION WATER-BASED COATING USING WATER-DISPERSIBLE EPOXY EMULSIFIER

CROSS-REFERENCE TO RELATED APPLICATIONS

This application is a continuation-in-part of copending application Ser. No. 909,858, filed May 26, 1958 now abandoned.

BACKGROUND OF THE INVENTION

1. Field of the Invention

This invention is concerned with epoxy emulsion coatings, particularly for low energy and lubricated surfaces.

2. Description of the Prior Art

Insofar as is now known, it has not been proposed to provide epoxy emulsion coating formulations using water-dispersible epoxy resin emulsifier.

SUMMARY OF THE INVENTION

This invention provides an oil-in-water emulsion coating formulation of a solution of epoxy resin having an epoxy equivalent weight between about 400 and about 6,000 in a solvent having the formula $ROCH_2CH_2OH$ where R is $C_5$–$C_7$ alkyl, a water-dispersible epoxy resin emulsifier, and a curing agent.

It also provides low energy metal substrates, lubricated metal substrates, and aluminum substrates coated with said epoxy emulsion coating formulations.

DESCRIPTION OF SPECIFIC EMBODIMENTS

The components in the emulsion formulations of this invention are epoxy resin or defunctionalized epoxy resin, a solvent having the formula $ROCH_2CH_2OH$ where R is $C_5$–$C_7$ alkyl, or mixtures of such alkoxyethanol solvent and a co-solvent, such as methyl ethyl ketone, containing at least 30 weight percent alkoxyethanol, water-dispersible epoxy resin emulsifier, curing agent, and, optionally, a catalyst for cross-linking.

The epoxy resin can be any polyglycidyl ether of polyhydric organic compounds, especially polyhydric phenols. Particularly preferred are the glycidyl ethers of bisphenols, a class of compounds which are constituted by a pair of phenolic groups linked through an intervening aliphatic bridge. While any of the bisphenols can be used, the compound 2,2-bis(p-hydroxyphenyl)-propane, commonly known as bisphenol A, is more widely available in commerce and is preferred. While polyglycidyl ethers can be used, diglycidyl ethers are preferred. The most preferred and commercially available epoxy resins are diglycidyl ethers of bisphenol A. Depending upon the degree of polymerization, the epoxy resins will have an epoxy equivalent weight of between about 400 and about 6,000. It is also within the contemplation of this invention to use a mixture of two or more epoxy resins in the emulsion coating formulations of this invention, provided each has an epoxy equivalent weight falling within the range of about 400 to about 6,000.

It is also within the contemplation of this invention to use an epoxy resin that has been defunctionalized or "capped". In general, defunctionalization is accomplished by reacting the epoxy resin with a sufficient amount of a compound that will react with an epoxy group (oxirane ring) to react with all the epoxy groups in the resin. Such compounds are known in the art and include water, alcohols, monocarboxylic acids, and phenols. In the case of diglycidyl ethers of bisphenols (e.g. bisphenol A), 2 moles of reactive compound per mole of diglycidyl ether will be used.

A preferred method of defunctionalization involves the use of a bisphenol, such as bisphenol A. When the resin used is a diglycidyl ether of a bisphenol having an epoxy equivalent weight of about 400 to about 6,000, the reacting molar ratio to effect defunctionalization is about 2 moles of bisphenol to about one mole of diglycidyl ether of bisphenol. Within the contemplation of this invention, however, a diglycidyl ether of a bisphenol having an epoxy equivalent weight lower than about 400 can be used. In this case, sufficient bisphenol is used to defunctionalize all the epoxy groups plus additional bisphenol sufficient to upgrade the molecular weight of the diglycidyl ether of bisphenol to the equivalent of that of a diglycidyl ether of a bisphenol having an epoxy equivalent weight of about 400–6,000. Generally, a molar ratio of bisphenol to diglycidyl ether of bisphenol of between about 3:2 and about 9:8 is feasible.

The reaction between the bisphenol and the diglycidyl ether of bisphenol is carried out at temperatures between about 100° C. and about 225° C. for a period of time between about 30 minutes and about 3 hours. The reaction is complete when the epoxy content is about 0.03 meq./g. or less. Generally, a catalyst, such as tri-n-butylamine, and a solvent, such as methyl isobutyl ketone, are used.

The organic solvent for the epoxy resin has been found to be an important factor with regard to emulsion properties and to film properties on low energy surfaces and lubricated surfaces. In order to achieve these properties, it appears that the solvent should have low solubility (less than about one weight percent) in water. 2-Hexoxyethanol was found to afford both good emulsion and wetting properties. The solvents utilizable herein are alkoxyethanols that have the formula $ROCH_2CH_2OH$, wherein R is $C_5$–$C_7$ alkyl, preferably 2-hexoxyethanol.

It has also been found that mixtures of alkoxyethanol with other solvents are utilizable, even though the other solvent alone will not form an emulsion with good wetting characteristics. Such other solvents include alcohols, ketones, and alkoxy alcohols. Such mixtures, however, should contain at least 30 weight percent $C_5$–$C_7$ alkoxyethanol, preferably 50 weight percent. A preferred combination is 2-hexoxyethanol and n-butanol. The partially replacing solvents should be chosen, preferably, from those having solubility in water of less than 10 weight percent, e.g., n-butanol, 1-butoxy-2-propanol, methyl isobutyl ketone, and the like.

The amount of solvent or solvent mixture to be used can vary over a wide range, dependent in part on the molecular weight of the epoxy resin. Relatively small amounts of solvents will be required for the lower molecular weight epoxy resins, while larger amounts of solvent will be used for higher molecular weight epoxy resins. In general, the amount of solvent or mixture of solvents used will be between about 25 parts and about 160 parts per 100 parts of total epoxy resin.

The emulsifier used in the emulsion coating formulations of this invention is a diglycidyl ether of bisphenol, or a defunctionalized diglycidyl ether of bisphenol, that has carboxyl functionality which is neutralized with ammonia, $NH_4OH$, or volatilizable tertiary amine. The carboxyl functionality is formed on the epoxy resin by adduction of a polycarboxylic acid or polycarboxylic acid anhydride. If the diglycidyl ether is not capped, a polycarboxylic acid is used to adduct to the epoxy moieties of the resin. If, however, the diglycidyl ether is capped, the anhydride is used to adduct to the hydroxyl functionality of the resin. In either case, no water of condensation is formed and anhydrous conditions are used.

When the polycarboxylic acid is used, succinic acid is preferred. Other polycarboxylic acids which can be used include trimellitic acid, methyl succinic acid, phthalic acid, hexahydrophthalic acid, and maleic acid.

When a polycarboxylic acid anhydride is used, trimellitic anhydride is preferred. Other cyclic anhydrides which can be used include succinic anhydride, methylsuccinic anhydride, tricarballylic anhydride, phthalic anhydride, hexahydrophthalic anhydride, and maleic anhydride.

The amount of polycarboxylic acid or anhydride used should be sufficient to obtain an acid number of about 35 to about 150, preferably between about 40 and about 90, in order to ensure water solubility when the resin is neutralized.

The diglycidyl ethers of bisphenol and the capped (defunctionalized) diglycidyl ethers of bisphenol utilizable to form the emulsifiers are those described hereinbefore. It has been found that emulsifiers can be formed in situ. For example, a diglycidyl ether of a bisphenol can be capped with bisphenol A and then a diglycidyl ether of bisphenol, or a mixture thereof, can be added and reacted with succinic acid to form the emulsifier in situ.

In forming an emulsion coating composition containing the carboxyl functional diglycidyl ether of bisphenol resin, the resin is neutralized with a tertiary amine, ammonia, or ammonium hydroxide to a pH of about 7.0 to about 9.1. Typical amines utilizable include triethylamine, tripropylamine dimethylethanolamine, diethylethanolamine, dimethylethylamine, and methyldiethylamine.

The curing agent can be any conventional curing agent that will not adversely affect the emulsion stability. Typical curing agents include acids, such as novolacs, dibasic carboxylic acids, carboxyl phthalocyanines, and dimer and trimer fatty acids; anhydrides of aliphatic and aromatic polycarboxylic acids; acrylics, such as polyacrylates, polymethacrylates, and polyacrylamides; and amides and miscellaneous nitrogen compounds, such as dicyandiamide and hydrazides. The various curing agents used with epoxy resins are discussed in Lee and Neville's "Handbook of Epoxy Resins" McGraw-Hill (1967).

The preferred curing agent material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine; 2,4,6-trihydrazine-1,3,5-triazine, and 2,4,6-triethyl-triamino-1,3,5-triazine. The mono-, di-, or triar-alkyl or mono-, di-, or tri-aryl melamines, for instance, 2,4,6-triphenyl-triamino-1,3,5-triazine can be used. Also utilizable are benzoguanamine and hexamethoxymethyl melamine. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like. It is preferred to use an aminoplast that is poorly water soluble.

Although not essential, it is preferrable to use an acid cross-linking catalyst. Suitable catalysts include acid phosphates, such as methyl acid phosphate and butyl acid phosphate; acid pyrophosphates, such as dimethyl acid pyro phosphate; organic acid sulfate esters; and organic sulfonic acids, such as p-toluene-sulphonic acid. Preferred catalysts are the acid phosphate and the acid sulfate esters of alkylphenoxypoly(ethyleneoxy)-ethanol that are known as anionic surfactants. The acid catalysts can be used for instance, in the form of amine or ammonium salts.

In the epoxy resin emulsion coating formulations of this invention, the emulsifier is itself an epoxy based resin, i.e., a carboxyl functional epoxy resin which can be capped or uncapped. After the coating has been set by heat curing, this carboxyl functional epoxy resin emulsifier becomes a part of the finished coating film, together with the capped or uncapped or uncapped epoxy resin (in the dispersed phase of the emulsion) and the curing agent. Thus, in determining the relative proportions of the components in the emulsion coating compositions it is convenient and feasible to consider the capped or uncapped epoxy emulsifier as "total epoxy resin".

In determining the relative proportions of components in the emulsion coating formulations of this invention, the base used is 100 parts total epoxy resin, all parts expressed herein being parts by weight. The total epoxy resin can be composed of between about 90 parts capped or uncapped epoxy resin: 10 parts carboxyl functional epoxy emulsifier and about 10 parts capped or uncapped epoxy resin: 90 parts carboxyl functional epoxy emulsifier.

The relative proportions of the components in the emulsion coating compositions of this invention, expressed in parts by weight per 100 parts by weight total epoxy resin, are:

| Component | Parts |
| --- | --- |
| Total epoxy resin | 100 |
| Solvent ($C_5$—$C_7$ alkoxy-ethanol containing) | 25–160 |
| Acid catalyst | 0–2 |
| Curing agent | 1–30 |
| Water | 200–600 |

The epoxy emulsion coating formulations of this invention are particularly adapted for coating metal substrates having low energy metal surfaces and lubricated metal surfaces such as aluminum, steel, and tin-plated steel. The rate of application will be sufficient to apply the coating at about 1–20 mg./sq.inc. Any of the usual methods can be used, including wiping, spraying and roll coat application. After application the coating is set by baking at about 250° F. to about 500° F. for between about 30 minutes and about one minute.

In the following examples, the specific commerical diglycidyl ethers of bisphenol (DGEBA) used are abbreviated as follows:

| DGEBA | Epoxy Equiv. Wt |
|---|---|
| Epoxy A | 2,000–2,500 |
| Epoxy B | 450– 550 |
| Epoxy C | 875–1,000 |
| Epoxy D | 185– 192 |
| Epoxy E | 875–1,025 |

The aminoplast used in all the formulations was a commercial mixed methoxy and butoxy hexaalkoxymethylmelamine.

The following examples describe the preparation of the carboxyl functional epoxy resin emulsifiers and capped epoxy resins used in the formulations of subsequent examples. In all examples, quantities given are in parts by weight, unless otherwise stated.

EXAMPLE 1

Epoxy-succinic acid resin

A reaction vessel was charged with 442 parts Epoxy B, 442 parts Epoxy E, 116.0 parts succinic acid, 110 parts methyl ethyl ketone, and 3 parts tri-n-butylamine (catalyst). The temperature was raised to 150° C., while removing sufficient MEK (100 parts) to maintain controlled reflux at this temperature. The reaction maintained at 150° C., for 1.5 hours and then poured into a poly(tetrafluoroethylene) lined tray and allowed to cool to ambient temperature. The resulting solid resin had an acid number of 32.0 and an epoxy content of 0.03 meq./g.

EXAMPLE 2

BPA—Epoxy—TMA

Into a reaction kettle there were charged 327.7 parts of diglycidyl ether of bisphenol A having an epoxy equivalent weight of 185 to 192 and 245.7 g. of bisphenol A. The mixture was heated rapidly over about 30 minutes to a temperature of about 120° C. An exotherm to about 185° C. occurred but the reaction mixture was not cooled. After about 45 minutes, the epoxy value was 0.002 meq./g. Then 101.4 g. methyl isobutyl ketone was slowly added and the reaction mixture was refluxed to remove any water present, in a water trap.

Thereafter, 46.4 g. trimellitic anhydride was added and the mixture was held at 120° C. for about 3 hours until the anhydride value was 1.5. Methyl isobutyl ketone (MIBK) was then removed by vacuum distillation to provide a material at 86.5 weight percent solids in MIBK. Then 179.7 g. 1-butoxy-2-propanol was added to bring the solids to 68.6 weight percent. The resulting material had an acid number of about 45.

EXAMPLE 3

BPA terminated epoxy resin

A two-liter kettle was charged with 570.0 g. of diglycidyl ether of bisphenol A having an epoxy equivalent weight of 185 to 192, 430.0 g. bisphenol A, and 100.0 g. methyl isobutyl ketone. The mixture was heated until homogeneous (ca. 100° C.) and 3.0 g. tri-n-butylamine was added and the temperature was increased to about 150° C. and maintained for 1.5 hours. The epoxy value was <0.04 meq./g. The resulting product was poured into a poly(tetrafluoroethylene) coated tray and allowed to cool to ambient temperature to afford a material at 95.5 wt. % solids.

The emulsion coating compositions of this invention are demonstrated in the following examples.

EXAMPLE 4

Epoxy A (90.0 g.) was dissolved in 40.5 g. of 2-hexoxyethanol and 10.0 g. of an epoxy-succinic acid resin (Example 1) with an acid number of 32 was dissolved in 4.5 g. of 1-butoxy-2-propanol by heating to 130° C. under mild agitation. The resin solution was then cooled to less than 60° C. and placed under high speed dispersing equipment where the following ingredients were added: 10.0 g. of aminoplast, 0.35 g. of 28% aqueous ammonia in 22.5 g. of deionized water. Deionized water (150.0 g.) was then slowly added under high speed agitation (approximately 2,000 ft./min. peripheral speed) to pass the inversion point, after which the mixer was slowed down to approximately 1,000 ft./min. and 50.0 g. of water was added at faster rate of addition.

The resulting emulsified coating composition had a viscosity of 22 cps., particle size of 2–15 microns (by visual microscope), a surface tension of less than 26.5 dynes/cm. and excellent wetting properties.

EXAMPLES 5–9

The following Table I contains examples of epoxy emulsions which were prepared in the same manner as that of Example 4. Amounts of components are in grams.

TABLE I

| Example | 5 | 6 | 7 | 8 | 9 |
|---|---|---|---|---|---|
| Epoxy-Succinic Acid resin | 20.0 | 40.0 | 50.0 | 70.0 | 90.0 |
| 1-Butoxy-2-propanol | 9.0 | 18.0 | 22.5 | 31.5 | 40.5 |
|  | 29.0 | 58.0 | 72.5 | 101.5 | 130.5 |
| Epoxy A | 80.0 | 60.0 | 50.0 | 30.0 | 10.0 |
| 2-Hexoxyethanol | 36.0 | 27.0 | 22.5 | 13.5 | 4.5 |
|  | 116.0 | 87.0 | 72.5 | 43.5 | 14.5 |
| Aminoplast | 10.0 | 10.0 | 10.0 | 10.0 | 10.0 |
| Ammonia (28%) | 0.7 | 1.4 | 1.75 | 2.45 | 3.15 |
| Deionized Water | 22.5 | 22.5 | 12.5 | 17.5 | 22.5 |
| Deionized Water | 200.0 | 200.0 | 210.0 | 205.0 | 200.0 |
|  | 378.2 | 378.9 | 379.25 | 379.95 | 380.65 |
| Surface tension (dynes/cm.) | 26.3 | 27.0 | 27.2 | 27.9 | 29.2 |
| Brookfield visc. (cps.) | 65 | 16 | 10 | 10 | 1300 |
| Particle size (microns) (turbidity method) | 0.69 | 0.24 | 0.19 | 0.14 | 0.09 |
| Wetting/Surface imperfections | Exc. | Exc. | Exc. | Good | Fair |

EXAMPLES 10-15

The following Table II contains examples of epoxy emulsions which were prepared in the same manner as Example 4, but using a Bisphenol A defunctionalized epoxy resin adducted with trimellitic anhydride with an acid number of 45 thus providing the necessary acid functionality for the emulsification process.

TABLE II

| Example | 10 | 11 | 12 | 13 | 14 | 15 |
|---|---|---|---|---|---|---|
| BPA-Epoxy-TMA | 10.0 | 20.0 | 40.0 | 50.0 | 70.0 | 90.0 |
| MIBK | 1.6 | 3.2 | 6.4 | 8.0 | 11.2 | 14.4 |
| 1-Butoxy-2-propanol | 2.9 | 5.8 | 11.6 | 14.5 | 20.3 | 26.1 |
|  | 14.5 | 29.0 | 58.0 | 72.5 | 101.5 | 130.5 |
| Epoxy A | 90.0 | 80.0 | 60.0 | 50.0 | 30.0 | 10.0 |
| 2-Hexoxyethanol | 40.5 | 36.0 | 27.0 | 22.5 | 13.5 | 4.5 |
|  | 130.5 | 116.0 | 87.0 | 72.5 | 43.5 | 14.5 |
| Aminoplast | 10.0 | 10.0 | 10.0 | 10.0 | 10.0 | 10.0 |
| Ammonia (28%) | .51 | 1.2 | 2.4 | 2.6 | 3.6 | 4.6 |
| Deionized Water | 22.5 | 22.5 | 22.5 | 22.5 | 21.5 | 21.5 |
| Deionized Water 200.0 | 200.0 | 200.0 | 200.0 | 200.0 | 200.0 |  |
|  | 378.01 | 378.7 | 379.9 | 380.1 | 380.1 | 381.1 |
| Brookfield visc. (cps.) | 88 | 27 | 77 | 18 | 11 | 9 |
| Particle size (microns) (microscoic observation) | 5-50 | 5-30 | <2-5 | <2-5 | <1-3 | <1-3 |
| Wetting/Surface imperfections | Exc. | Exc. Exc. | Exc | Good | Fair |  |

EXAMPLES 16-20

The following examples were prepared in the same manner as Example 4 but using defunctionalized epoxy resin (bisphenol A terminated) (Example 3) instead of Epoxy A and using various solvents to demonstrate effect on surface tension.

TABLE III

| Example | 16 | 17 | 18 | 19 | 20 |
|---|---|---|---|---|---|
| BPA terminated epoxy resin | 50 | 50 | 50 | 50 | 50 |
| Epoxy-succinic acids resin | 50 | 50 | 50 | 50 | 50 |
| 2-Ethoxyethanol | 45 | — | — | — | — |
| 2-Butoxyethanol | — | 45 | — | — | — |
| 2-Hexoxyethanol | — | — | 45 | — | — |
| 1-Methoxy-2-propanol | — | — | — | 45 | — |
| 1-Butoxy-2-propanol | — | — | — | — | 45 |
| Aminoplast | 10 | 10 | 10 | 10 | 10 |
| Ammonia (28%) | 1.75 | 1.75 | 1.75 | 1.75 | 1.7 |
| Deionized Water | 12.5 | 12.5 | 12.5 | 12.5 | 12.5 |
| Deionized Water | 210 | 210 | 210 | 210 | 210 |
|  | 379.25 | 379.25 | 379.25 | 379.25 | 379.25 |
| Surface tension (dynes/cm.) | 37.7 | 30.7 | 26.8 | 36.6 | 31.9 |
| Wetting/Surface imperfections | Very Poor | Poor | Exc. | Very Poor | Poor |

EXAMPLE 21

This example demonstrates in situ synthesis of the BPA capped epoxy resin followed by synthesis of the epoxy-succinic acid resin.

A four liter resin kettle was charged with 570.0 g. of Epoxy D, 430.0 g. of bisphenol A and 100.0 g. of methyl isobutyl ketone. The contents of the flask were heated until a homogeneous mixture was obtained (ca. 100° C.) at which point 3.0 g. of tri-n-butyl amine (catalyst) was added. Heating was continued to 150° C. and maintained for 1.5 hours. The reaction vessel was then charged with 116.0 g. of succinic acid, 442.0 g. of Epoxy B, 110.0 g. of methyl ethyl ketone, 442.0 g. of Epoxy E and 3.0 g. of tri-n-butyl amine. The temperature was again raised to 150° C. while removing 100 g. of solvent and maintained at that temperature for 1.5 hours. The resulting reaction product was poured onto a poly(tetrafluorethylene) coated tray and allowed to cool to ambient temperature to afford a material at 95.4% solids with an acid number of 15.8 and epoxy content of 0.03 meq./g.

EXAMPLE 22

The resin of Example 21 (800.0 g.) was dissolved in a blend of 180 g. of 1-butoxy-2-propanol and 180 g. of 2-hexoxyethanol by heating at 130° C. under mild agitation. This resin solution was cooled to about 60° C. and placed under a high speed dispersing equipment where the following ingredients were added under agitation: 72.2 g. of aminoplast, 11.0 g. of 28% aqueous ammonia solution preblended with 188.0 g. of deionized water, 12.8 g. of α(p-nonyl phenol)-omega-hydroxy poly-(oxyethylene) sulfate ammonium salt (58% active ingredients) preblended with 188.0 g. of deionized water.

Deionized water (1361.0 g.) was then slowly added under high speed agitation (approximately 2000 ft./min. peripheral speed) to pass the inversion point at which point the mixer was slowed down to approximately 1000 ft./min. and the rest of the water added at a faster rate of addition.

The emulsion obtained presented particle size in the 1-2 micron range, pH of 7.75, and Brookfield viscosity of 18 cps.

Panels of lubricated tinplated steel (approximately 0.01" thick) were coated by wire wound bar application and cured by baking 4 minutes at 350° F. After cooling the coated panels presented the following properties:

| | |
|---|---|
| Appearance | Excellent |
| Dry film thickness | 0.1–0.2 mil. |
| MEK double rubs | 50 |
| Crosshatch adhesion | Excellent |
| Wedge bend | 70 mm. pass |
| Pasteurization (45'-170° F.): | |
| Adhesion | Excellent |
| Blush | Excellent |

EXAMPLES 23-34

The following examples demonstrate the use of a combination of two hydrophobic solvents to partially replace 2-hexoxyethanol. Three ratios of water to total organic solvent were used for each solvent composition to exemplify the effect of the level of 2-hexoxyethanol on wetting and surface imperfection. Each replacing solvent has less than 10% by weight solubility in water. Data are set forth in Table IV.

TABLE IV

| Example | 23 | 24 | 25 | 26 | 27 | 28 | 29 | 30 | 31 | 32 | 33 | 34 |
|---|---|---|---|---|---|---|---|---|---|---|---|---|
| BPA Epoxy/Epoxy Succinic (Example 21) | 9.54 | | | | | | | | | | | |
| MEK | 4.6 | | | | | | | | | | | |
| (Resin Solution) | 100.0 | | | | | | | | | | | |
| 2-Hexoxyethanol | 7.5 | 7.5 | 7.5 | 15.0 | 15.0 | 15.0 | 22.5 | 22.5 | 22.5 | 30.0 | 30.0 | 30.0 |
| 1-Butoxy-2-propanol | 18.75 | 18.75 | 18.75 | 15.0 | 15.0 | 15.0 | 11.25 | 11.25 | 11.25 | 7.5 | 7.5 | 7.5 |
| n-butanol | 18.75 | 18.75 | 18.75 | 15.0 | 15.0 | 15.0 | 11.25 | 11.25 | 11.25 | 7.5 | 7.5 | 7.5 |
| (Cosolvent) | 45.0 | | | | | | | | | | | |
| Aminoplast | 9.5 | | | | | | | | | | | |
| $NH_3$ (28%) | 1.45 | | | | | | | | | | | |
| Catalyst (See Ex. 22) | 1.7 | | | | | | | | | | | |
| Water | 225 | 372 | 549 | 225 | 372 | 549 | 225 | 372 | 549 | 225 | 372 | 549 |
| | 382.65 | 529.65 | 706.65 | 382.65 | 529.65 | 706.65 | 382.65 | 529.65 | 706.65 | 382.65 | 529.65 | 706.65 |
| % 2-Hexoxyethanol in Cosolvent | 16.7 | 16.7 | 16.7 | 33.0 | 33.0 | 33.0 | 50.0 | 50.0 | 50.0 | 66.6 | 66.6 | 66.6 |
| Water/Org. Solvent | 4.5 | 7.5 | 11.0 | 4.5 | 7.5 | 11.0 | 4.5 | 7.5 | 11.0 | 4.5 | 7.5 | 11.0 |
| Surface tension | 27.4 | 28.1 | 29.0 | 27.4 | 28.0 | 28.8 | 26.8 | 27.1 | 27.3 | 26.6 | 26.7 | 26.8 |
| Wetting/Surface Imperfections | Fair | Very Bad | Very Bad | Fair | Bad | Very Bad | Exc. | Fair | Fair | Exc. | Fair | Fair |

It has been found that defunctionalized (capped) epoxy resins, when used as the component (a) in the emulsions of this invention, impart longer storage stability properties than do uncapped epoxy resins. This is demonstrated in the following example.

EXAMPLE 35

Samples of the emulsions of Example 4 (uncapped epoxy) and of Example 18 (capped epoxy) were stored at 130° F. Within 6 days, resin had separated from the emulsion of Example 4. After 2 weeks, there was slight resin separation from the emulsion of Example 18.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An oil-in-water emulsion coating formulation containing in parts by weight:

(a) a capped epoxy resin having an epoxy equivalent weight between about 400 and about 6,000;

(b) a carboxyl functional epoxy resin having an epoxy equivalent weight between about 400 and about 6,000 having an acid number between about 35 and about 150 or a carboxyl functional capped epoxy resin having an epoxy equivalent weight between about 400 and about 6,000 having an acid number between about 35 and about 150;

(c) the ratio of (a):(b) being between about 90 parts:10 parts and about 10 parts:90 parts, the relative proportions of the following components, based upon (a) plus (b) being 100 parts;

(d) sufficient tertiary amine, ammonia, or ammonium hydroxide to neutralize (b) to a pH of about 7.0 to about 9.1;

(e) between about 25 parts and about 160 parts of an alkoxyethanol solvent having the formula $ROCH_2CH_2OH$, wherein R is $C_{5-7}$ alkyl, or a mixture of said alkoxyethanol and at least one co-solvent, selected from the group consisting of alkoxy alcohols, and ketones, containing at least about 30 weight percent of said alkoxyethanol;

(f) between about 0 part and about 2 parts of an acid cross-linking catalyst;

(g) between about 1 part and about 30 parts of a conventional curing agent for an epoxy resin; and (h) between about 200 parts and about 600 parts of water.

2. The formulation of claim 1, wherein said alkoxyethanol solvent is 2-hexoxyethanol.

3. The formulation of claim 2, wherein said curing agent is an aminoplast.

4. The formulation of claim 3, wherein said aminoplast is a commercial mixed methoxy and butoxy hexaalkoxymethylmelamine.

5. The formulation of claims 3 or 4, wherein (a) is a bisphenol A capped diglycidyl ether of bisphenol A.

6. The formulation of claim 5, wherein (b) is an adduct of equal parts of a diglycidyl ether of bisphenol A having an epoxy equivalent weight of 450–550 and a diglycidyl ether of bisphenol A having an epoxy equivalent weight of 875–1,025 with succinic acid and having an acid number of 32.

* * * * *

UNITED STATES PATENT AND TRADEMARK OFFICE
CERTIFICATE OF CORRECTION

PATENT NO. : 4,179,440
DATED : December 18, 1979
INVENTOR(S) : Carlos J. Martinez It is certified that error appears in the above-identified patent and that said Letters Patent are hereby corrected as shown below:

Col. 7, Table II, "Deionized Water 200.0" should read --Deionized Water--.
      Under Example 15, insert --200.0--.

Col. 7, Table II, after "observation", insert closing parenthesis.

Table II, Example 11, delete "Exc." (second occurrence).
      Example 13, "Good" should read --Exc.--.
      Example 14, "Fair" should read --Good--.
      Example 15, last line, insert --Fair--.

Col. 7, Table III, "succinic acids" should read --succinic acid--.

Table III, Example 20, "1.7" should read --1.75--.

Table III, "Deionized Water 12.5" should read --Deionized Water--.

Table III, Example 20, opposite "Deionized Water" (first occurrence), insert --12.5--.

Cols. 9-10, Table IV, "9.54" should read --95.4--.

UNITED STATES PATENT AND TRADEMARK OFFICE
CERTIFICATE OF CORRECTION

PATENT NO. : 4,179,440
DATED : December 18, 1979
INVENTOR(S) : Carlos J. Martinez It is certified that error appears in the above-identified patent and that said Letters Patent are hereby corrected as shown below:

Cols. 9-10, Table IV,
    Example 23, "529.65" should read --382.65--.
    Example 24, "706.65" should read --529.65--.
    Example 25, "382.65" should read --706.65--.
    Example 26, "529.65" should read --382.65--.
    Example 27, "706.65" should read --529.65--.
    Example 28, "382.65" should read --706.65--.
    Example 29, "529.65" should read --382.65--.
    Example 30, "706.65" should read --529.65--.
    Example 31, "382.65" should read --706.65--.
    Example 32, "529.65" should read --382.65--.
    Example 33, "706.65" should read --529.65--.
    Example 34, under "549", insert --706.65--.

Table IV, Example 23, following each of "95.4", "4.6", "9.5", "1.45" and "1.7", a line should be extended across the entire table, indicating that these numbers are repeated in each example.

Signed and Sealed this

Fifteenth Day of April 1980

[SEAL]

Attest:

SIDNEY A. DIAMOND

Attesting Officer     Commissioner of Patents and Trademarks